United States Patent [19]

Youmans

[11] Patent Number: 4,978,851
[45] Date of Patent: Dec. 18, 1990

[54] METHOD AND APPARATUS FOR MEASURING SUBSURFACE CHARACTERISTICS USING PULSED NEUTRON/GAMMA RAY LOGGING

[75] Inventor: Arthur H. Youmans, Houston, Tex.
[73] Assignee: Western Atlas International Inc.
[21] Appl. No.: 16,168
[22] Filed: Feb. 19, 1987

Related U.S. Application Data

[63] Continuation-in-part of Ser. No. 721,109, Apr. 19, 1985.

[51] Int. Cl.$^5$ .............................................. G01V 5/10
[52] U.S. Cl. ................................... 250/270; 250/268
[58] Field of Search ............... 250/270, 519.1, 390 I, 250/268, 518.1

[56] References Cited

U.S. PATENT DOCUMENTS

| | | | |
|---|---|---|---|
| 2,842,678 | 7/1958 | Silverman | 250/519.1 |
| 3,665,195 | 5/1972 | Youmans | 250/83.3 R |
| 4,191,884 | 3/1980 | Scott | 250/270 |
| 4,233,508 | 11/1980 | Arnold | 250/259 |
| 4,287,415 | 9/1981 | Arnold | 250/270 |
| 4,423,323 | 12/1983 | Ellis et al. | 250/264 |
| 4,486,658 | 12/1984 | Scott et al. | 250/268 |

FOREIGN PATENT DOCUMENTS 1543982 4/1979 United Kingdom .

*Primary Examiner*—Janice A. Howell
*Assistant Examiner*—Richard Hanig

[57] ABSTRACT

Methods and apparatus for directly and more accurately assaying radiological characteristics of elements with a subsurface formation surrounding a bore hole. An instrument is provided which comprises a pulsed neutron source, a high resolution gamma ray detector and means for isolating a portion of the instrument in a neutron absorbing envelope comprised of a solution of fresh water and a neutron absorbing substance. This isolation means eliminates deleterious bore hole effects and maximizes the measurement of formation capture gamma rays. The applications of the present invention include measuring the presence of an element and measuring the ratio of two elements within a formation surrounding a bore hole.

3 Claims, 1 Drawing Sheet

METHOD AND APPARATUS FOR MEASURING SUBSURFACE CHARACTERISTICS USING PULSED NEUTRON/GAMMA RAY LOGGING

RELATED APPLICATION

This application is a continuation-in-part of application serial number 06/721,109, filed Apr. 8, 1965.

BACKGROUND OF THE INVENTION

This invention relates generally to radiological well logging apparatus and methods for investigating subsurface earth formations traversed by a borehole and, more particularly, provides improved methods and apparatus for pulsed neutron/gamma ray logging to identify and measure various specific elements in such subsurface earth formations.

A number of well logging techniques in use come under the classification of pulsed neutron/gamma ray logging. In their basic form, these techniques involve cyclically irradiating subsurface earth formations with pulses or bursts of high energy neutrons and determining the effects on formation constituent: of the irradiating neutrons by measuring gamma rays produced thereby. The present invention contemplates the detection and measurement of gamma rays resulting from thermal neutron capture during the interval between source bursts. The energies of the capture gamma rays are characteristic of the specific elements capturing the neutrons, and gamma rays of these characteristic energies are detected to identify and measure these elements.

A primary objective of the present invention is to determine accurately the abundance in subsurface earth formations of particular preselected elements which may be present only in minor proportions. Moreover, the invention is directed at the difficult case where an element of interest is present in both the earth formation and the borehole environment. This circumstance results in spurious or inaccurate results when methods of the prior art are employed, for example, in detecting the presence of low concentrations of salt water in a formation surrounding a salt water injection well, where gamma rays are produced due to capture of neutrons by sodium and chlorine in both the borehole and the formation. It is of course impossible to differentiate between the respective regions of origin of the gamma rays. As a consequence, the small number of gamma rays produced by NaCl of low concentration in the formation will be obscured by interference from the gamma rays produced by the salt water in the borehole. Techniques have been developed to alleviate this problem; however, they often involve multiple measurements or cumbersome and complex corrections and correlations which in themselves may have dubious accuracy.

These and other disadvantages of the prior art are overcome by the present invention which provides methods for directly and more accurately measuring subsurface formation characteristics such as the presence of a particular element or the ratio of the abundance of two particular elements within an earth formation surrounding a borehole.

SUMMARY OF THE INVENTION

In the preferred embodiment of the invention, methods and apparatus are provided which, in their overall concept, directly and more accurately measure the abundance of preselected elements within an earth formation surrounding a borehole. The apparatus comprises a pulsed neutron source, high resolution gamma ray spectrometer and means for isolating at least the gamma ray detector in a neutron absorbing environment. This isolating means further comprises an envelope having neutron absorbing materials in its materials of construction and means for filling this envelope with neutron absorbing fluid. The neutron absorbing environment isolates at least the gamma ray detector from deleterious borehole effects to maximize the relative detection efficiency of formation capture gamma rays and substantially eliminate detection of gamma rays from specific preselected elements present in the borehole.

In the operation of the above apparatus, the instrument is lowered into a borehole adjacent a formation of interest. The envelope is then inflated with the neutron absorbing fluid to provide the neutron absorbing environment. The pulsed neutron source is activated thereby irradiating the formation, the gamma ray detector detects the resulting capture gamma rays and produces a spectrum of pulses conforming to the energy distribution of the detected gamma ray spectrum. The relative number of gamma rays in various energy ranges may be determined by a pulse height analyzer, and these data may be processed to yield such information as the presence of a particular element or the ratio of the abundance of two specific elements within the formation.

DETAILED DESCRIPTION OF THE PREFERRED EMBODIMENT

Figure 1:
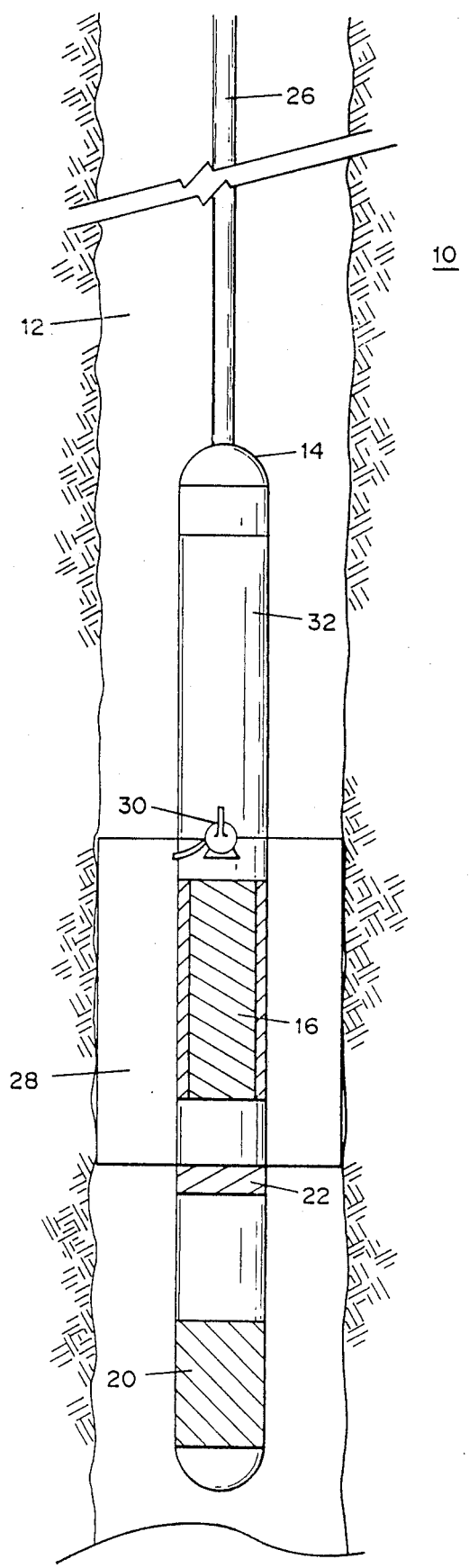
FIG. 1 is a cross-sectional view of a typical pulsed neutron/gamma ray logging tool utilized in practicing the methods herein disclosed.

The present invention provides methods of and apparatus for directly and more accurately assaying preselected elements and the ratios of the abundances of those elements within a subsurface earth formation surrounding a borhehole.

Referring now to FIG. 1 in more detail, there is illustrated schematically a radioactivity well surveying operation in which a portion of the earth 10 is shown in vertical section. Borehole 12 penetrates the earth's surface and may or may not be cased. Disposed within borehole 12 is instrument 14 which includes high resolution gamma ray detector assembly 16 and pulsed neutron source 20. Detector assembly 16 should be capable of selectively detecting only the desired gamma rays and rejecting those having energies slightly higher or lower than those desired. Such a detector system is preferably, but not limited to, a cryogenically cooled intrinsic germanium detector system with spectral analysis capability in combination with a multichannel analyzer. Source 20 is preferably, but not limited to, an accelerator source using a D-T reaction to produce fast neutrons having an energy of approximately 14 MeV. Radiation shield 22, preferably of tungsten is interposed between detector assembly 16 and source 20. Cable 26 suspends instrument 14 within borehole 12 and contains the required conductors for electrical communication between the instrument and the surface apparatus. Cable 26 is wound on or unwound from a drum (not pictured) in raising or lowering instrument 14 to traverse borehole 12.

A portion of instrument 14 including at least detector assembly 16 is surrounded by inflatable envelope 28. Envelope 28 is preferably constructed of a fabric or elastomer containing a substantial amount of neutron absorbing material within its materials of construction. When inflated, envelope 28 is filled by pump 30 with a neutron absorbing fluid from reservoir 32. The neutron absorbing fluid is preferably fresh water mixed with an element or compound which is a neutron absorbed that is not an element sought to be detected in the formation. The concentration of the neutron absorber, in solution with fresh water to form such fluid, should be at least 1,000 ppm. Further, the neutron absorber in the fluid should either emit no capture gamma rays or only capture gamma rays sufficiently distinct from the elements of interest so as to not interfere in the measurement of those elements. The neutron absorbing material of envelope 28 and the neutron absorber in the fluid may, for example, be boron or lithium, lithium being an example of an absorber which would cause no interference with measurement of the elements in the formation as lithium emits no capture gamma rays at all. However, boron or other neutron absorbers may also be used, so long as they are not elements to be measured in the formation, because the capture gamma rays they emit will be readily distinquishable from those characteristic of the elements in the formation.

Instrument 14 may include data processing circuitry including a multi-channel analyzer for processing the data downhole, or this circuitry may be located at the surface for processing there. The location of this circuitry is not restrictive of the invention herein described.

In the operation of the aforementioned apparatus, instrument 14, with envelope 28 deflated is lowered within borehole 12 until instrument 14 is adjacent the formation of interest. Pump 30 is then activated to inflate envelope 28 with the neutron absorbing fluid from reservoir 32 until substantially all of the borehole fluid between envelope 28 and the wall of borehole 12 is displaced. Pulsed neutron source 20 is then activated to bombard the formation of interest with bursts of fast neutrons. The resulting capture gamma rays are measured by detector assembly 16 in the latter part of the quiescent interval between neutron bursts, that is, at a preselected time interval following each burst. For example, if the burst frequency is 1000 bursts per second and neutrons are produced in 10 microsecond burst intervals, the quiescent interval is 990 microseconds, from which capture gamma rays might be measured in the last 190 microseconds prior to the next burst. The burst frequency, burst time and measurement interval may vary due to borehole, formation and equipment conditions and are preselected based upon these conditions. The values presented above are for illustrative purposes only.

The purpose of measuring the capture gamma rays in the latter part of the quiescent interval as well as the purpose of providing a portion of instrument 14 with a neutron absorbing environment is to assure that the only relevant capture gamma rays being measured by detector assembly 16 are those originating within the formation. The delay in the measurement of the capture gamma rays assures that neutrons slowed down near or within borehole 12 have dissipated and that the capture gamma rays produced within borehole 12 have also dissipated. Further, the neutron absorbing environment displaces the borehole fluid sufficiently to eliminate most of its influence on the neasurement and further allows both the neutrons slowed within borehole 12 and the capture gamma rays produced within borehole 12 to dissipate before reaching detector assembly 16. Still further, the neutron absorbers in envelope 28 and the fluid prevent neutrons from entering envelope 28 and reacting with the fluid to produce interfering capture gamma rays. The only capture gamma rays that are produced in the vicinity of detector assembly 16, then, are those from the neutron absorber, which is chosen such that gamma rays produced by neutron reactions therewith are sufficiently distinct from the elements of interest so as not to interfere with the measurements. The only other capture gamma rays measured by detector assembly 16, therefore, are those that are produced within the formation.

Detector assembly 16, in turn, produces a signal corresponding to the energy of each capture gamma ray detected. These energies and the signals corresponding to these energies are characteristic of specific elements and provide a means for differentiating between the various elements of a formation. Specific signals corresponding to the elements of interest may be isolated by the use of a multi-channel analyzer, which is set to process only those signals of interest. The resulting data may further be processed to obtain desired results.

By way of example, the aforementioned apparatus may be used to measure the ratio of the abundance of two elements in a formation, such as the hydrogen-to-chlorine ratio of a formation surrounding a salt water injection well. First, instrument 14 is lowered into borehole 12 until detector assembly 16 is adjacent the formation of interest. Envelope 28 is then filled to isolate at least detector assembly 16 in a neutron absorbing environment. Pulsed neutron source 20 is activated at the preselected burst frequency, and detector assembly 16 measures the capture gamma rays at the preselected time intervals to produce signals corresponding to the abundance and energies of the respective measured gamma rays. The signals are sent to the multi-channel analyzer where those signals corresponding to hydrogen and chlorine are further processed. The number of capture gamma rays of each element measured by detector assembly 16 are proportional to the abundance of that element in the formation; therefore, the signals corresponding to hydrogen and chlorine may be directly compared to produce a ratio for the hydrogen-to-chlorine abundance in the formation.

The apparatus may also be utilized to detect elements having low concentrations within a formation, such as detecting the presence of arsenic and other toxins in aquifers. This ability results from the features of the present invention which greatly reduce deleterious borehole effects to maximize the relative sensitivity to formation capture gamma rays.

In a particular case it may be desired to measure the concentration, $C_A$, of an element A. To do so first a system having a detector and spectral analyzer must be set to detect the energies of one or more of the capture gamma rays emitted by element A upon reaction with neutrons emitted from the pulsed neutron source. Such energies are commonly known in the art and may be found for particular elements in published tables. When such a system is arranged to detect selectively gamma radiation from the desired element, it will be observed that the rate of detection of gamma rays will be proportional to $C_A$. Thus, the number of counts per second due to element A, $N_A$, follows the relationship:

$$N_A = C_A K_A \sigma_A \qquad (1)$$

Wherein $K_A$ is a constant dependent upon the size and geometry of the detector, the particular setting of the spectral analyzer and other parameters relating to the instrument and borehole conditions; and A is the neutron capture cross section of element $\sigma A$. $K_A$ may be evaluated by with the instrument system by observing $N_A$ in a test pit or other environment similar to the logging environment to be encountered but having a known concentration of element A.

Having evaluated $K_A$ in a known medium, the concentration $C_A$ can be evaluated in other similar media from the relation $$C_A = \frac{N_A}{K_A \sigma_A}. \qquad (2)$$

If measurement are made in media having varying amounts of other constituents, allowances must be made for these variations as the number of neutrons captured by element A will vary inversely with the number of neutrons captured by other elements in the medium. This number of competing events is proportional to the macroscopic neutron capture cross section, $\Sigma$ f, the measurement of which is well known in the art as exemplified by U.S. Pat. Nos. 3,379,882 and 3,379,884 which issued to the present inventor, which are assigned to the assignee of the present invention, and which are hereby incorporated by reference for all purposes. Alternatively, $\Sigma$ f can be measured using the present apparatus if means are provided to observe the rate of decay of neutrons during the interval between neutron bursts. Accordingly the concentration of element A is determined from the relation $$C_A = \frac{N_A \sigma_A}{K_A \Sigma_A}. \qquad (3)$$

Many modifications and variations in the techniques and uses as described herein may be made without substantially departing from the concept of the present invention. Accordingly, it should be clearly understood that the form of the invention herein described and the specific uses of the invention herein presented are exemplary only, and are not intended as a limitation on the scope of the present invention.

The embodiments of the invention in which an exclusive property or priviledge is claimed are defined as follows:

1. A method of directly measuring the ratio of the abundance of a first and second element within a subsurface earth formation surrounding a bore hole without interference from said elements within said bore hole, comprising the steps of:
   positioning an instrument within said bore hole adjacent said earth formation, said instrument having a pulsed neutron source and a high resolution gamma ray detector;
   isolating a portion of said instrument and a volume of said bore hole proximate said portion of said instrument, in an envelope having neutron absorbing materials in the materials of its construction, said portion of said instrument including at least said high resolution gamma ray detector;
   filling said envelope with a neutron absorbing fluid until substantially all of the bore hole fluid between said envelope and said bore hole is displaced, said neutron absorbing fluid adapted to prevent emission of gamma rays upon neutron capture;
   cyclically irradiating said earth formation proximate said instrument with a burst of neutrons;
   measuring after a preselected time interval during the quiescent period following each of said bursts of neutrons the capture gamma rays emitted from the capture of said neutrons within said formation, the step of measuring further comprising detecting with said high resolution gamma ray detector said capture gamma rays emitted from the capture of said neutrons, and producing signals corresponding to the energies of said detected capture gamma rays; and
   deriving from said measure of said capture gamma rays the ratio of said abundances of said first and second elements within said formation by isolating said signals corresponding to the energies of capture gamma rays characteristic of said first and second elements, and deriving a ratio of said abundances of said first and second elements from said isolated signals.

2. A method of directly determining the presence of an element within an earth formation surrounding a bore hole without interfence from said element within said bore hole, comprising the steps of:
   positioning within said bore hole adjacent said earth formation an instrument having a pulsed neutron source and a high resolution gamma ray detector;
   isolating a portion of said instrument, and a volume of said bore hole proximate said portion of said instrument, in an envelope having neutron absorbing materials in the materials of its construction, said portion of said instrument including at least said high resolution gamma ray detector;
   bombarding said earth formations with periodic bursts of neutrons from said pulsed neutron source;
   filling said envelope with a solution of fresh water and a neutron absorbing fluid that substantially emits no gamma rays upon neutron capture, any signals emitted from said solution are characteristic and readily distinguishable from any signals corresponding to energies of capture gamma rays from said element;
   measuring after a preselected time interval following each of said periodic bursts of neutrons the capture of said neutrons within said formation, by detecting with said high resolution gamma ray detector said capture gamma rays emitted from the capture of said neutrons, and producing signals corresponding to the energies of said detected capture gamma rays; and
   determining from said measure of said capture gamma rays the presence of said element within said formation by isolating said signals corresponding to the energies of capture gamma rays characteristic of said element, and determining from said isolated signals the presence of said element within said earth formation.

3. An instrument for measuring radiological characteristics of elements within an earth formation surrounding a bore hole without interference from said elements within said bore hole, comprising:
   means for pulsatingly irradiating said earth formation with bursts of neutrons;

high resolution gamma ray detector means for detecting gamma rays resulting from said irradiating; and means, containing neutron absorbing materials within the materials of construction thereof, for isolating a portion of said instrument and a volume of said bore hole proximate said instrument, said portion of said instrument including at least said high resolution gamma ray detector means, to restrict said detected gamma rays to those resulting from elements within said formation, wherein said isolating means comprises an enveloping means having neutron absorbing materials in the materials of construction thereof, surrounding at least said portion of said instrument, and means for inflating said enveloping means by filling said enveloping means with neutron absorbing fluid, said neutron absorbing fluid substantially emitting no gamma rays upon neutron capture;

said inflating means further comprising pumping means for pumping said neutron absorbing fluid into said enveloping means and a reservoir for storing said neutron absorbing fluid, said reservoir fluidly coupled to said pumping means.

* * * * *